United States Patent
Reinmuth et al.

(10) Patent No.: US 10,001,374 B2
(45) Date of Patent: Jun. 19, 2018

(54) MICROMECHANICAL SENSOR AND METHOD FOR MANUFACTURING A MICROMECHANICAL SENSOR

(71) Applicant: Robert Bosch GmbH, Stuttgart (DE)

(72) Inventors: Jochen Reinmuth, Reutlingen (DE); Robert Maul, Pforzheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 221 days.

(21) Appl. No.: 14/815,185

(22) Filed: Jul. 31, 2015

(65) Prior Publication Data
US 2016/0033274 A1    Feb. 4, 2016

(30) Foreign Application Priority Data

Jul. 31, 2014    (DE) .................. 10 2014 215 038

(51) Int. Cl.
*G01C 19/5712*    (2012.01)
*G01C 19/56*    (2012.01)
(Continued)

(52) U.S. Cl.
CPC ..... *G01C 19/5712* (2013.01); *G01C 19/5621* (2013.01); *G01C 19/5656* (2013.01);
(Continued)

(58) Field of Classification Search
CPC ............ G01C 19/5712; G01C 19/5769; G01C 19/5762; G01C 19/5726; G01C 19/574;
(Continued)

(56) References Cited

U.S. PATENT DOCUMENTS

| | | | | |
|---|---|---|---|---|
| 5,920,012 A | * | 7/1999 | Pinson | G01C 19/5719 73/504.04 |
| 6,722,197 B2 | * | 4/2004 | Knowles | G01C 19/5719 73/504.04 |

(Continued)

*Primary Examiner* — Helen Kwok
(74) *Attorney, Agent, or Firm* — Norton Rose Fulbright US LLP; Gerard Messina

(57) ABSTRACT

A micromechanical sensor is provided as including a substrate having a main extension plane and a mass element movable relative to the substrate, the movable mass element being coupled to the substrate via a spring structure, the spring structure including a first and a second spring element, the first and second spring elements extending essentially in parallel to each other in sections and being coupled to each other in sections, the spring structure including a first and a second compensation element for quadrature compensation, the first compensation element being connected to the first spring element, the second compensation element being connected to the second spring element, the first spring element having a first spring structure width extending along a transverse direction, the second spring element having a second spring structure width extending along the transverse direction, the first compensation element in a first subarea extending in parallel to the transverse direction along a first width, the first spring structure width and the first width being different, the second compensation element in a second subarea extending in parallel to the transverse direction along a second width, the second spring structure width and the second width being different.

12 Claims, 14 Drawing Sheets

(51) Int. Cl.
*G01C 19/5621* (2012.01)
*G01C 19/5656* (2012.01)
*G01C 19/5733* (2012.01)
*G01C 19/5769* (2012.01)
*G01P 15/125* (2006.01)

(52) U.S. Cl.
CPC ..... *G01C 19/5733* (2013.01); *G01C 19/5769* (2013.01); *G01P 15/125* (2013.01)

(58) Field of Classification Search
CPC ............ G01C 19/5719; G01C 19/5747; G01C 19/5621; G01C 19/5656; G01C 19/573
See application file for complete search history.

(56) References Cited

U.S. PATENT DOCUMENTS

| | | | | |
|---|---|---|---|---|
| 6,843,127 B1* | 1/2005 | Chiou | ................ | G01C 19/5719 73/504.12 |
| 2002/0011117 A1* | 1/2002 | Orsier | ................ | B81B 3/0051 73/860 |
| 2006/0156814 A1* | 7/2006 | Blomqvist | ......... | G01C 19/5712 73/504.12 |
| 2007/0220973 A1* | 9/2007 | Acar | .................. | G01C 19/5719 73/504.12 |
| 2008/0314144 A1* | 12/2008 | Blomqvist | ......... | G01C 19/5762 73/504.12 |
| 2009/0165553 A1* | 7/2009 | Klemetti | ............ | G01C 19/5712 73/504.04 |
| 2010/0095768 A1* | 4/2010 | Acar | .................. | G01C 19/5712 73/504.04 |
| 2010/0186507 A1* | 7/2010 | Gunthner | ............. | G01C 19/574 73/504.14 |
| 2012/0060604 A1* | 3/2012 | Neul | .................... | G01C 19/574 73/504.12 |
| 2012/0096943 A1* | 4/2012 | Potasek | .................. | G01C 19/56 73/504.14 |
| 2012/0222483 A1* | 9/2012 | Blomqvist | ......... | G01C 19/5719 73/504.12 |
| 2014/0144232 A1* | 5/2014 | Lin | ....................... | B81B 3/0051 73/504.12 |
| 2015/0082885 A1* | 3/2015 | Rinkio | ............... | G01C 19/5712 73/504.12 |
| 2015/0377621 A1* | 12/2015 | Chaumet | ............. | G01C 19/574 73/504.16 |
| 2016/0362291 A1* | 12/2016 | Spahlinger | ........... | B81B 3/0086 |

* cited by examiner

Fig. 3
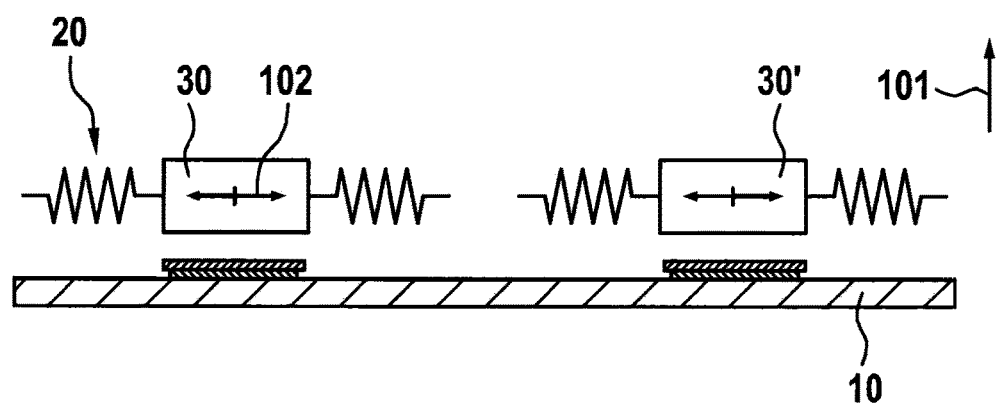
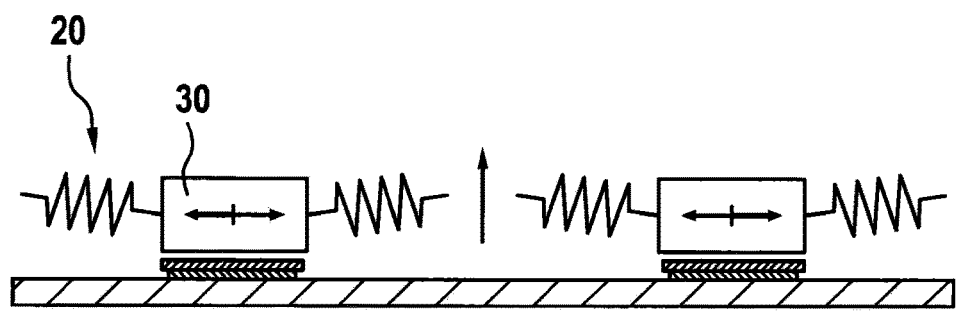

Fig. 4
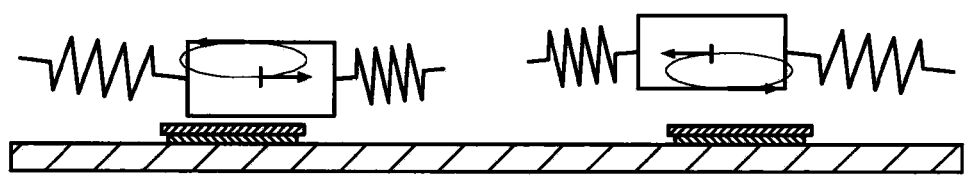

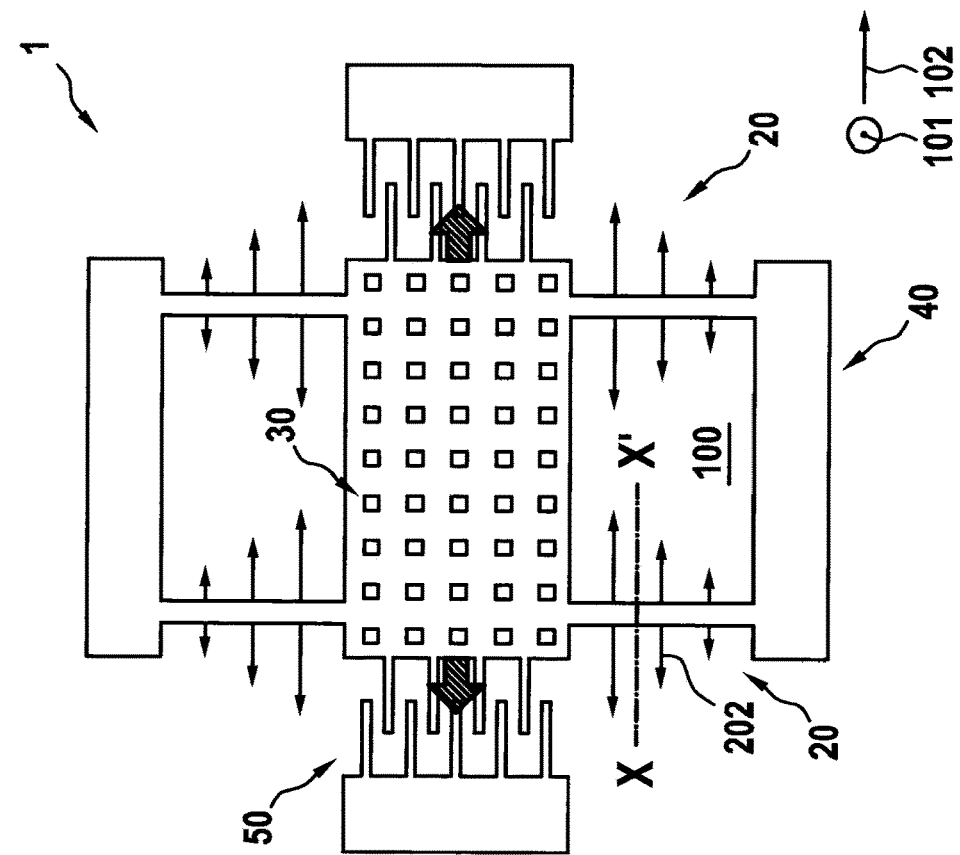
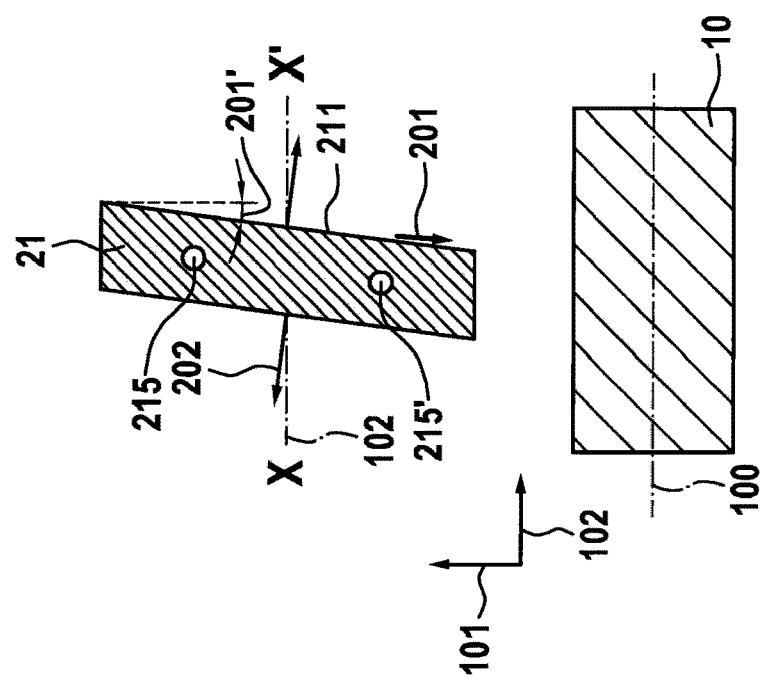
Fig. 5

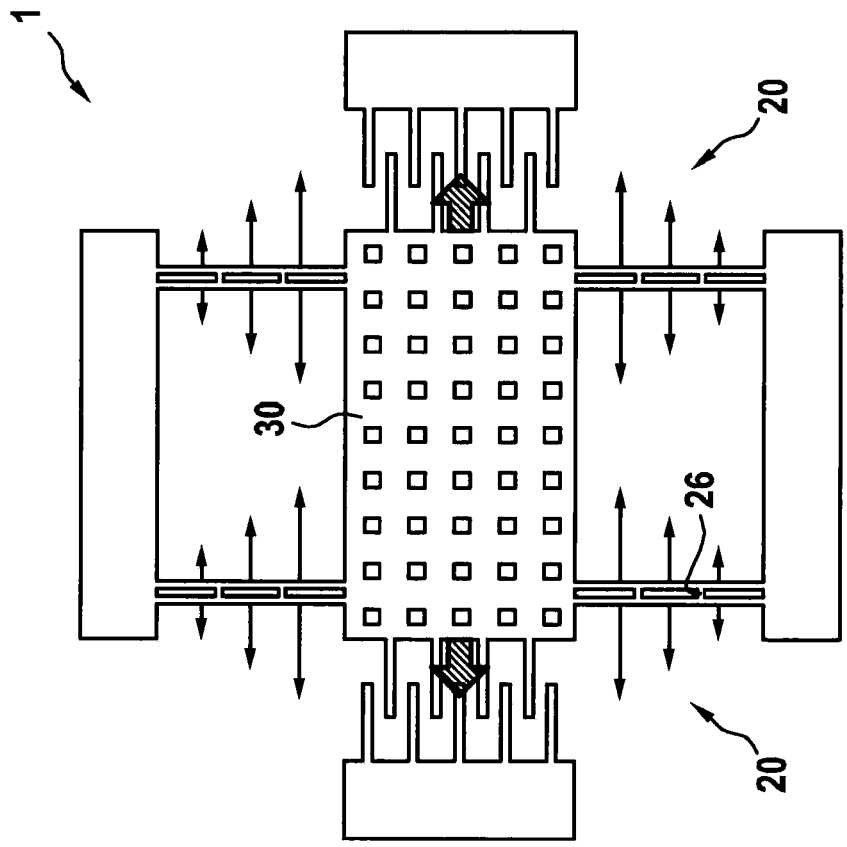
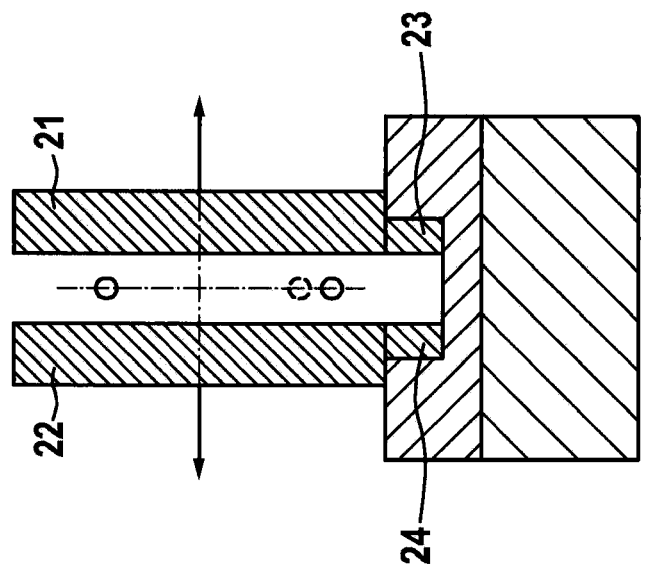
Fig. 9

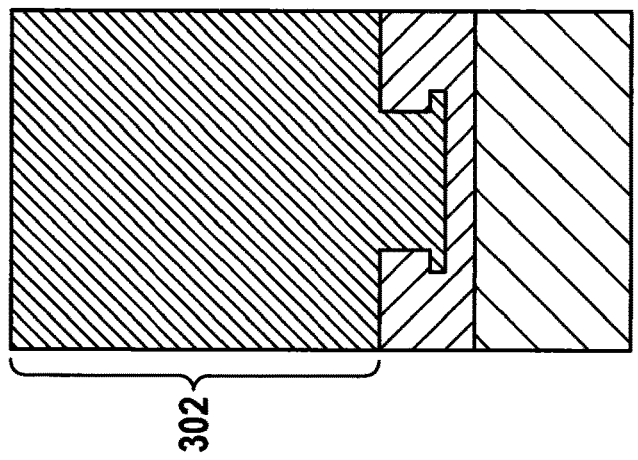
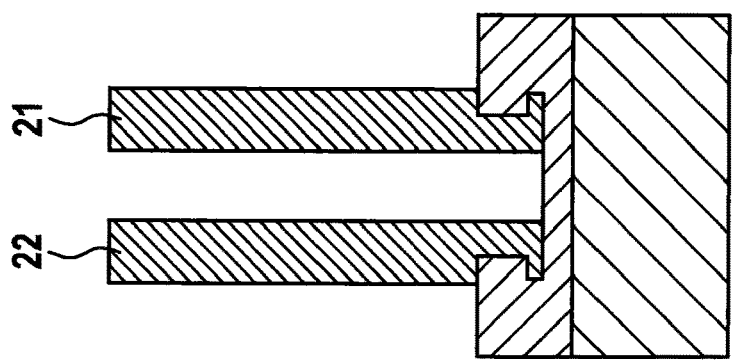
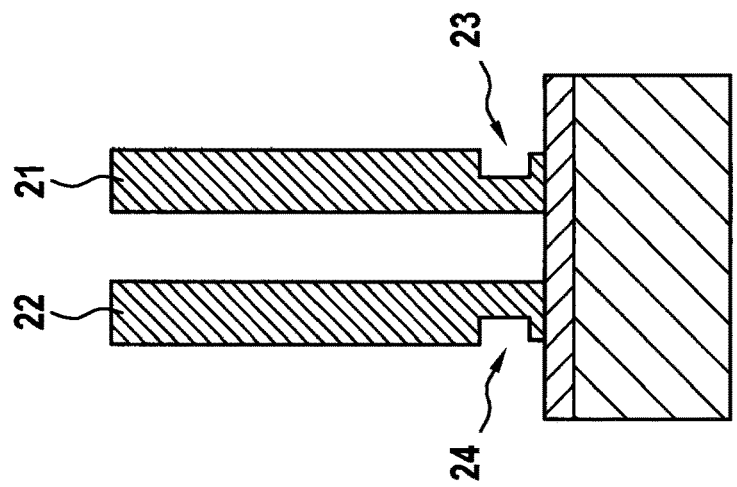

MICROMECHANICAL SENSOR AND METHOD FOR MANUFACTURING A MICROMECHANICAL SENSOR

FIELD OF THE INVENTION

The present invention is directed to a micromechanical sensor.

BACKGROUND INFORMATION

Such micromechanical sensors are generally known. For example, micromechanical sensors are used to detect accelerations and/or rotation rates, the micromechanical sensor including a substrate and silicon structures movable relative to the substrate.

For example, the movable silicon structures include two movable masses which are moved along a drive plane antiparallel to each other, a deflection movement of the two masses out of the drive plane being capacitively detected in order to determine a rotation rate of the micromechanical sensor. The drive plane may be oriented essentially in parallel or perpendicularly to the main extension plane of the substrate.

Such movable silicon structures are typically manufactured in two consecutive steps, the silicon structures initially being created in an etching process by structuring a functional layer. Subsequently the silicon structures are exposed, a sacrificial layer between the substrate and the silicon structures being removed.

The disadvantage with the known micromechanical sensors is that the flanks of the silicon structures (also referred to as etching flanks or trench flanks) created during the structuring of the functional layer are frequently inclined by an angle (also referred to as etching angle or trench angle) with respect to a normal direction which is essentially perpendicular to the main extension plane of the substrate, so that in this way a deviating movement (faulty deflection) of the two movable masses is induced. The faulty deflection also occurs when the micromechanical sensor is in a rest position, so that a wobbling motion of the two seismic masses is caused, an error signal (i.e., a so-called quadrature signal) being generated. A quadrature compensation may typically only be reduced by comparatively complex additional measures.

SUMMARY

It is an object of the present invention to provide a micromechanical sensor and a method for manufacturing a micromechanical sensor, so that the micromechanical sensor has a reduced quadrature signal compared to the related art.

The micromechanical sensor according to the present invention and the method according to the present invention for manufacturing a micromechanical sensor have the advantage over the related art that a comparatively compact and cost-effective micromechanical sensor is provided, which nonetheless has a reduced quadrature compared to the related art. In this way, it is advantageously possible for the first and second compensation elements (which in this document are also referred to as the first or second additional structure) to be shaped and/or situated on the first or second spring element in such a way that the spring structure mechanically behaves like a straight etched spring—i.e., does not generate a wobbling motion—even if it is formed obliquely by the etching process (i.e., in particular has a trench flank or etching flank having a non-vanishing trench angle). The wobbling motion refers in particular to a mechanically induced faulty deflection or deviation of the deflection movement from a drive direction which takes place during a deflection movement of the mass element along the drive direction (oriented in parallel or perpendicularly to the main extension plane of the substrate). This means in particular that, due to the attachment of the first compensation element on the first spring element and the attachment of the second compensation element on the second spring element, it is advantageously possible to largely prevent the wobbling motion usually occurring in the related art even with a non-vanishing trench angle, in particular also when the micromechanical sensor is in a rest position. In this way, the quadrature error signal (error signal) generated by the wobbling motion of the mass element is at least reduced compared to the related art or even completely avoided. According to one preferred specific embodiment of the present invention, it is provided that the first and second spring elements are coupled to each other in sections. Due to the implementation of two spring elements (i.e., of the first and second spring elements), which extend essentially in parallel to each other in sections and in particular are (mechanically) coupled to each other in sections, it is furthermore advantageously possible for the quadrature signal to be reduced compared to the related art by compensating (or even deliberately overcompensating) for a faulty deflection of one of the two spring elements by the respective other spring element of the two spring elements. In this way, a micromechanical sensor having a comparatively easily manufacturable compensation element for mechanical quadrature compensation is provided, additionally the development complexity and the proneness of the entire sensor to faults being reduced compared to the related art. The two spring elements are preferably designed as spring beams, alternatively it also being possible for the spring elements to have a curved shape—a U shape, for example. It is furthermore advantageously possible to use a comparatively compact evaluation circuit due to the mechanical quadrature compensation by the compensation element, so that the size of the rotation rate sensor is reduced compared to the related art. The two compensation elements are preferably formed of a first layer, and the two spring elements are formed of a second layer, the first layer being situated between the substrate and the second layer. The compensation elements are further preferably at least partially formed during the structuring of the second layer, so that the first spring structure width and the first width are different, and so that the second spring structure width and the second width are different. In this way, it is advantageously possible to provide a micromechanical sensor in such a way that the shape and/or arrangement of the first and second compensation elements is/are adapted to the trench angle created during the structuring of the second functional layer.

According to one preferred refinement, it is provided that a flank of the first spring element extends along a longitudinal direction toward the substrate, the first width of the first compensation element and the second width of the second compensation element being essentially equally large when the longitudinal direction and a normal direction are oriented in parallel to each other, the normal direction being oriented essentially perpendicularly to the main extension plane of the substrate, and/or the first width of the first compensation element and the second width of the second compensation element being different when the longitudinal direction and the normal direction are not oriented in parallel to each other.

In this way, it is advantageously possible according to the present invention for the first width of the first compensation element and the second width of the second compensation element to be predefined by the trench angle (which is enclosed between the normal direction and the longitudinal direction) in a self-adjusting manner. In this way, a quadrature compensation is implemented in a comparatively simple and efficient manner.

According to one further preferred refinement, it is provided that the first compensation element is connected to the first spring element in such a way that the first compensation element is at least partially situated between the substrate and the first spring element, the second compensation element being connected to the second spring element in such a way that the second compensation element is at least partially situated between the substrate and the second spring element.

In this way, it is advantageously possible according to the present invention for the first and second compensation elements for quadrature compensation to be situated on the first or second spring element (in particular below the particular spring element) so that the compensation elements are configured at least partially together with the spring elements during the structuring of the second layer. In this way, it is advantageously possible to manufacture the micromechanical sensor in a self-adjusting way—i.e., the shape and/or arrangement of the first and second compensation elements is/are adapted as a function of the trench angle created during the structuring of the second functional layer.

According to one further preferred refinement, it is provided that a first cross-sectional area of the first spring element and a second cross-sectional area of the second spring element have the same cross-sectional shape, in particular the first spring structure width and the second spring structure width being equally large.

In this way, it is advantageously possible according to the present invention for the quadrature compensation to be primarily achieved by the first and second compensation elements.

According to one further preferred refinement, it is provided that the first compensation element in a further first subarea extends in parallel to the transverse direction along a further first width, the second compensation element in a further second subarea extending in parallel to the transverse direction along a further second width, the further first width being greater than the first spring structure width and/or the further second width being greater than the second spring structure width.

In this way, it is advantageously possible according to the present invention for a compensation element to be situated on the spring element in such a way that the first and/or second subarea(s) extend(s) in parallel to the transverse direction beyond the spring element, so that a comparatively narrow first subarea in combination with a relatively wide second subarea adapts a mechanical rigidity of the spring structure (in particular with the aid of L-shaped compensation elements) as a function of a width (defined by the trench angle) of the second subarea (in a self-adjusting manner). In this way, it is advantageously furthermore possible for a compensation element to be attached on the spring element and nonetheless an additional increase in the height of the micromechanical sensor along the normal direction compared to the related art to be largely avoided.

According to one further preferred refinement, it is provided that the first subarea is primarily situated in an area of the first spring element facing the second spring element, the second subarea being primarily situated in an area of the second spring element facing the first spring element.

In this way, it is advantageously possible according to the present invention for a geometric shape and/or arrangement of the first and second compensation elements which is/are adapted (in a self-adjusting manner) to the particular trench angle to be achieved, so that a mechanical quadrature compensation is achieved in a comparatively simple and efficient manner.

According to one preferred refinement of the method according to the present invention, it is provided that the spring structure is configured in such a way that the first spring element has a first spring structure width extending along a transverse direction, and the second spring element has a second spring structure width extending along the transverse direction, in the fourth method step the first compensation element being configured in such a way that the first compensation element in a first subarea extends in parallel to the transverse direction along a first width and the first spring structure width and the first width are different, in the fourth method step the second compensation element being configured in such a way that the second compensation element in a second subarea extends in parallel to the transverse direction along a second width and the second spring structure width and the second width are different.

In this way, it is advantageously possible according to the present invention for the first and second compensation elements to be formed of the first layer, so that the first width of the first compensation element and the second width of the second compensation element are adapted to the trench angle.

According to one further preferred refinement of the method according to the present invention, it is provided that the first compensation element in an area facing the second spring element is connected to the first spring element and/or the second compensation element in an area facing the first spring element is connected to the second spring element.

In this way, it is advantageously possible according to the present invention for the first and second compensation elements to be created in the same structuring step or etching step in which also the first and second spring elements are created. In this way, it is advantageously possible to manufacture the micromechanical sensor in a self-adjusting way—i.e., the shape and/or arrangement of the first and second compensation elements is/are adapted as a function of the trench angle created during the structuring of the second functional layer.

According to one further preferred refinement of the method according to the present invention, it is provided that the first spring element is configured in the fourth method step in such a way that a flank of the first spring element extends along a longitudinal direction toward the substrate, a trench angle being enclosed between the longitudinal direction and a normal direction which is essentially perpendicular to a main extension direction of the substrate, the spring structure being formed in such a way that the first width and/or the further first width of the first compensation element is predefined by the trench angle and/or the second width and/or the further second width of the second compensation element is predefined by the trench angle.

In this way, it is advantageously possible according to the present invention for the compensation elements to be situated relative to the spring in such a way that the widths of the compensation elements are adapted to the trench angle in such a way that in particular a quadrature induced by oblique trench flanks is compensated for by the compensation elements. In particular, in the fourth method step, i.e., in the trench process, the compensation elements are at least partially configured together with the spring elements.

Exemplary embodiments of the present invention are shown in the drawings and are described in greater detail in the following description.

BRIEF DESCRIPTION OF THE DRAWINGS

FIGS. 1 through 5 show a micromechanical sensor according to different specific embodiments of the present invention.

FIG. 9 shows a micromechanical sensor and a spring structure according to one specific embodiment of the present invention.

FIGS. 10a through 10f and 11a through 11g show a method for manufacturing a micromechanical sensor according to different specific embodiments of the present invention.

DETAILED DESCRIPTION

Figure 1:
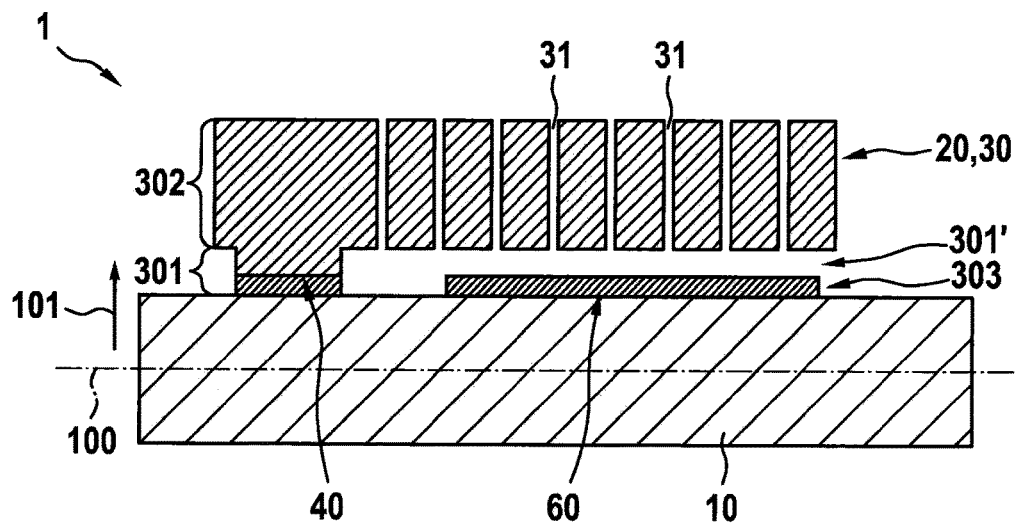

Identical parts are always denoted by the same reference numerals in the various figures and are therefore generally also cited or mentioned only once.

FIG. 1 shows a schematic cross-sectional view of a micromechanical sensor 1 according to one specific embodiment of the present invention.

Micromechanical sensor 1 is designed as a rotation rate sensor and/or acceleration sensor, for example.

Micromechanical sensor 1 includes a substrate 10 having a main extension plane 100, a normal direction 101 which is essentially perpendicularly oriented to the main extension plane 100 being shown here. The micromechanical sensor moreover includes a mass element 30 movable relative to substrate 10, movable mass element 30 being coupled via a spring structure 20 (only indicated here) to substrate 10 or being joined to substrate 10 in a spring-elastic manner. Mass element 30 and spring structure 20 are also referred to in summary here as movable silicon structures 20, 30.

Micromechanical sensor 1 furthermore preferably includes a first layer 301 and a second layer 302, first layer 301 being situated between substrate 10 and second layer 302. For example, first layer 301 includes a sacrificial layer, preferably an oxide layer, and/or second layer 302 includes a functional layer 302, preferably a silicon layer. At least a portion of first layer 301 has been removed here—i.e., movable silicon structures 20, 30 are exposed. First layer 301 moreover in particular includes a third layer 303—for example a comparatively thin third layer 303, preferably a polysilicon layer.

To create movable silicon structures 20, 30, second layer 302 is structured (in particular by using an etching process), trenches 31 being created in the second layer which have a comparatively high aspect ratio. Thereafter, first layer 301 is at least partially removed—i.e., in particular at least the sacrificial layer of first layer 301 situated beneath the comparatively thick second layer 302 is removed (see reference numeral 301'), so that silicon structures 20, 30 are freely movable. In addition, third layer 303 situated between movable silicon structures 20, 30 and the substrate is shown here. This third layer 303 includes, for example, a suspension area 40 for suspending movable silicon structures 20, 30 and/or an electrode area 60 beneath movable mass element 30 and/or a conductor area.

Figure 2:
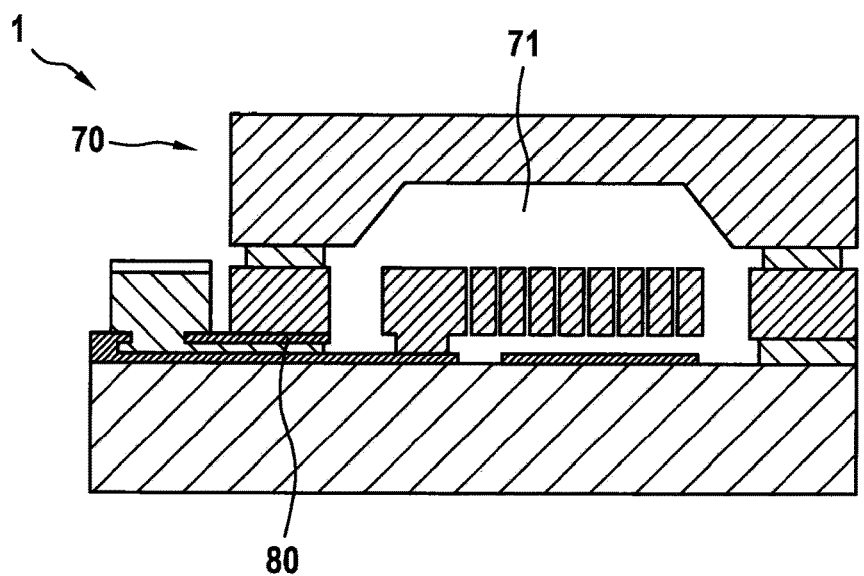

FIG. 2 shows a schematic cross-sectional view of a micromechanical sensor 1 according to one specific embodiment of the present invention, in particular the specific embodiment shown here being essentially identical to the other specific embodiments of the present invention. Micromechanical sensor 1 includes a cap structure 70 here for hermetically sealing movable structures 20, 30, the movable structures being situated in a cavity 71. Cap structure 70 is created by applying a cap wafer onto a sensor wafer, using a bonding process for example, so that cavity 71 is formed. Moreover, a conductor area 80 created from third layer 303 for electrically contacting movable structures 20, 30 situated in cavity 71 is shown here.

FIGS. 3 and 4 show a schematic cross-sectional view of a micromechanical sensor 1 according to one specific embodiment of the present invention, in particular the specific embodiment shown here being essentially identical to the other specific embodiments of the present invention, micromechanical sensor 1 shown here including mass element 30 and a further mass element 30' (which hereafter are also referred to as two masses 30, 30'). Two masses 30, 30' are acted upon by a drive movement in such a way that two masses 30, 30' are deflected anti-parallel (parallel in opposite directions) along a drive direction 102 (drive deflection). FIG. 3 (top) shows two masses 30, 30' in a rest position of micromechanical sensor 1, i.e., the micromechanical sensor is situated in an inertial system here. Due to the antiparallel drive deflection of the two masses, micromechanical sensor 1 is configured in such a way that an output signal of micromechanical sensor 1 includes a piece of information as to whether the micromechanical sensor is acted upon by an acceleration (see FIG. 3, bottom)—the two masses 30, 30' being deflected in parallel to each other along a detection direction (along normal direction 101 here)—or acted upon by a rotation rate (see FIG. 4, top)—two masses 30, 30' being deflected antiparallel to each other along the detection direction (along normal direction 101 here). Such a deflection of two masses 30, 30' is also referred to as a detection deflection here, and the associated movement of two masses 30, 30' as a detection movement. The drive deflection here takes place along drive direction 102 oriented in parallel to main extension plane 100, and the detection deflection here takes place along normal direction 101 oriented perpendicularly to main extension plane 100. Alternatively, micromechanical sensor 1 is configured in such a way that the drive deflection takes place along normal direction 101 oriented perpendicularly to main extension plane 100, and the detection deflection takes place along drive direction 102 oriented in parallel to main extension plane 100. It was established that it is comparatively difficult in both cases in the related art to implement a movement of the two masses exactly in parallel or perpendicular to main extension plane 100 of substrate 10, since the structuring of the functional layer does not take place completely perpendicularly, and different trench angles are present with different micromechanical sensors. An effect resulting therefrom is shown by way of example in FIG. 4 (bottom), not exactly perpendicular trench angles causing the drive movement and/or the detection movement of two masses 30, 30' to have a movement component in each case perpendicular to the desired movement direction (i.e., to the drive direction or detection direction). Two masses 30, 30' carry out a wobbling motion (having a movement component along the detection direction) even when micromechanical sensor 1 is in the rest position. The wobbling motion (quadrature) in particular causes an error signal (a so-called quadrature signal), which is prevented or reduced according to the present invention by mechanical quadrature compensation.

FIG. 5 shows a schematic view of a micromechanical sensor 1 according to one specific embodiment of the present invention, in particular the specific embodiment shown here being essentially identical to the other specific embodiments of the present invention. FIG. 5 (right side) shows a schematic top view onto micromechanical sensor 1, spring structure 20 being additionally shown here. Movable mass element 30 is joined to suspension area 40 in a spring-elastic manner via spring structure 20 here, so that movable mass element 30 carries out a drive movement along drive direction 102 (which is also referred to as transverse direction 102 here) when movable mass element 30 is acted upon by the drive movement by a drive system 50 of micromechanical sensor 1. Spring structure 20 includes a first and a second spring element 21, 22, FIG. 5 (left side) showing only first spring element 21 of spring structure 20 along intersecting line X-X' in a schematic cross-sectional view, in particular the following description of first spring element 21 applying in a corresponding manner also to second spring element 22. First spring element 21 includes a flank 211 (trench flank or etching flank), which extends along a longitudinal direction 201 toward substrate 10. Longitudinal direction 201 and normal direction 101 are not in parallel here—i.e., longitudinal direction 201 encloses a non-vanishing trench angle 201' with normal direction 101. This means, for example, that an upper center of area 215 of an upper part of first spring element 21 is situated offset from a lower center of area 215' of a lower part of first spring element 21 along a projection direction which is parallel to normal direction 101, so that the wobbling motion is generated—i.e., oblique flank 211 of first spring element 21 in this example causes mass element 30 to be moved along movement direction 202 having a component which is parallel to normal direction 101 when mass element 30 is driven along drive direction 102 of substrate 10 which is parallel to main extension plane 100—and in particular also when micromechanical sensor 1 is in a rest position.

Figure 6:
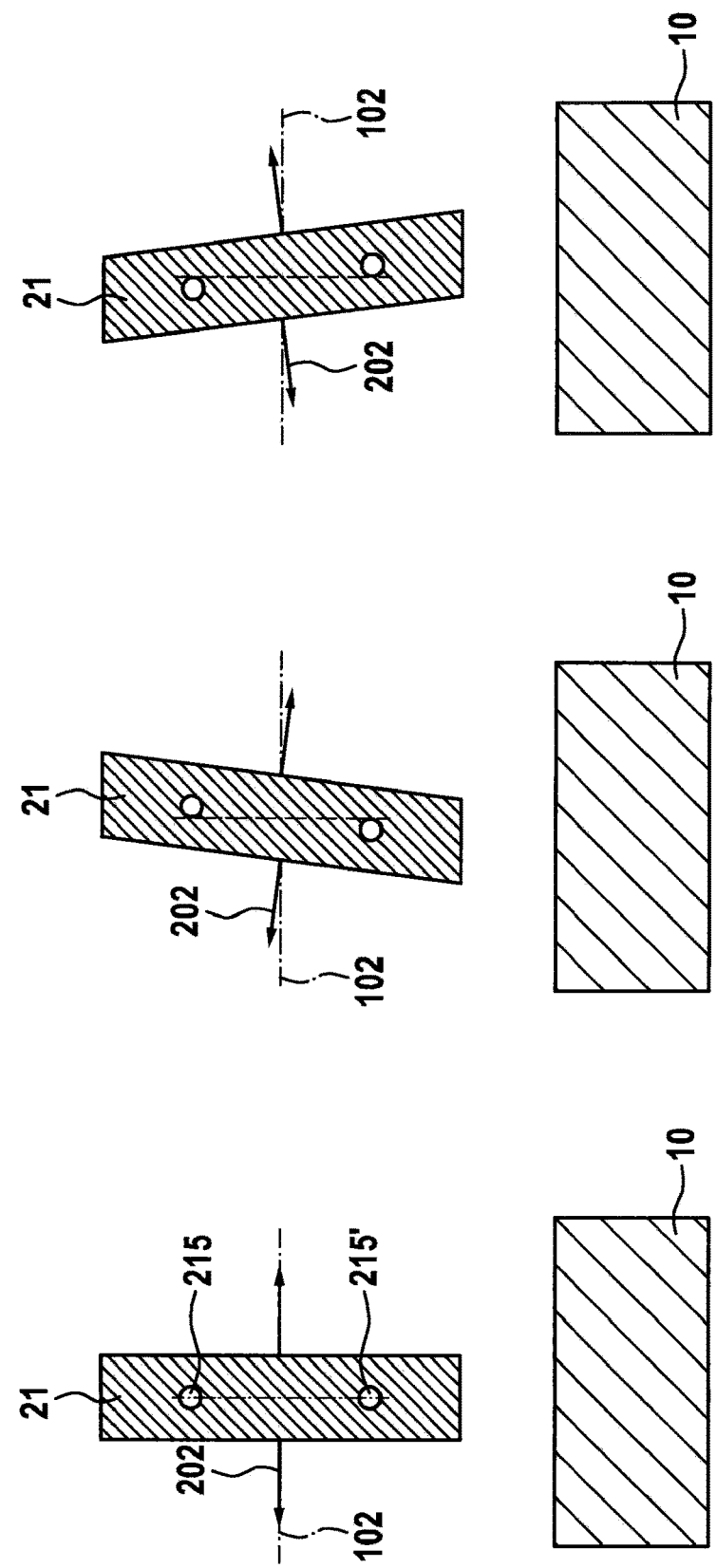
FIGS. 6 through 8 show a spring structure of a micromechanical sensor according to different specific embodiments of the present invention.

FIG. 6 shows a schematic cross-sectional view of a spring structure 20 of a micromechanical sensor 1 according to different specific embodiments of the present invention, in particular the specific embodiment shown here being essentially identical to the other specific embodiments of the present invention. FIG. 6 shows a first spring element 21, longitudinal direction 201 and normal direction 101 being oriented in parallel to each other (left side), or longitudinal direction 201 and normal direction 101 not being oriented in parallel to each other (center illustration and right side).

Figure 7:
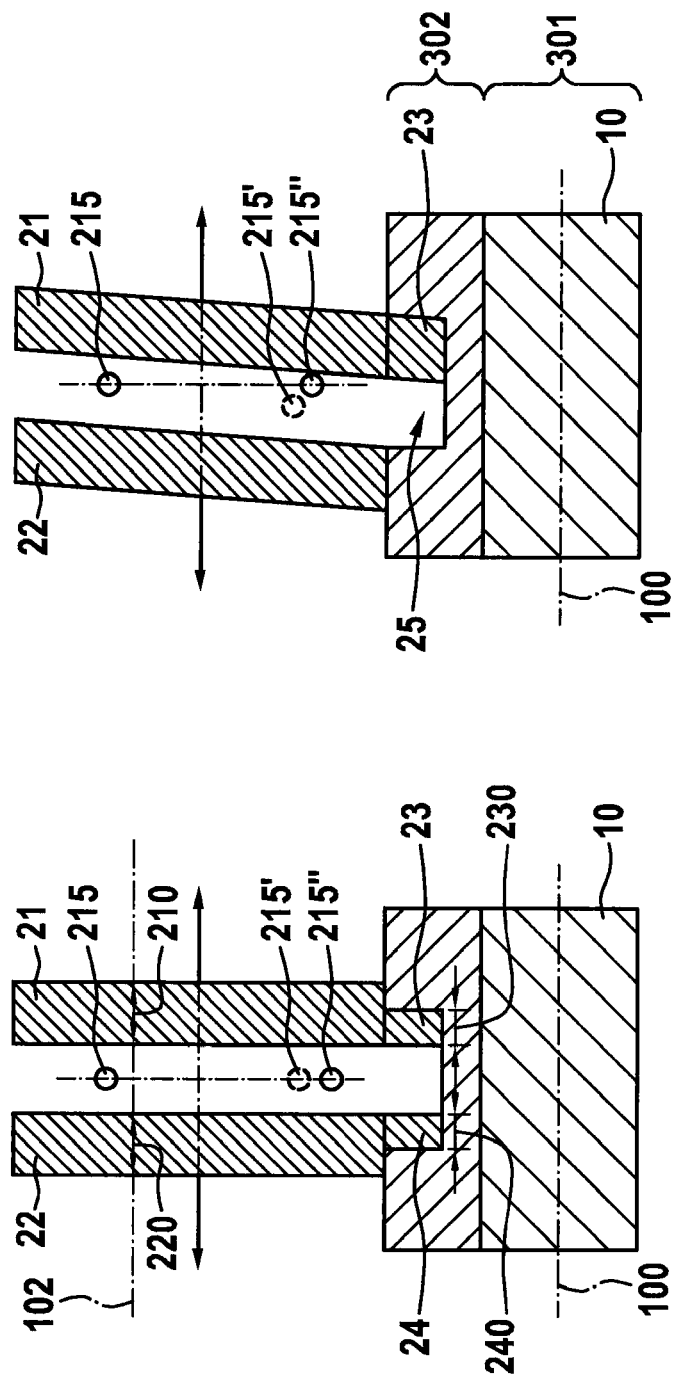

FIG. 7 shows a schematic cross-sectional view of a spring structure 20 of a micromechanical sensor 1 according to different specific embodiments of the present invention, in particular the specific embodiments shown here being essentially identical to the other specific embodiments of the present invention. Spring structure 20 is configured in such a way that first and second spring elements 21, 22 extend essentially in parallel to each other in sections and are coupled to each other in sections. A cross section of spring structure 20 along a transverse direction 102 is shown here, transverse direction 102 being oriented in particular perpendicularly to a main extension direction of spring structure 20 (for example in the case of spring elements 21, 22 designed as spring beams) or perpendicularly to a main progression line of spring structure 20 (for example in the case of a U-shaped spring structure 20). In addition to first and second spring elements 21, 22, spring structure 20 also includes a first and a second compensation element 23, 24 for quadrature compensation, first compensation element 23 being connected to first spring element 21, second compensation element 24 being connected to second spring element 22. First spring element 21 has a first spring structure width 210 extending along transverse direction 102, and second spring element 22 has a second spring structure width 220 extending along transverse direction 102. First compensation element 23 extends in a first subarea in parallel to transverse direction 102 along a first width 230, and second compensation element 24 extends in a second subarea in parallel to transverse direction 102 along a second width 240. According to the present invention, it is preferred for first spring structure width 210 and first width 230 to be differently wide, and for second spring structure width 220 and second width 240 to be differently wide. FIG. 7 shows on the left side a spring structure 20 according to one specific embodiment of the present invention, longitudinal direction 201 and normal direction 101 being oriented in parallel to each other. FIG. 7 moreover shows on the right side an alternative specific embodiment of the present invention, longitudinal direction 201 and normal direction 101 not being oriented in parallel to each other.

In particular, by attaching a compensation element—first compensation element 23 here—to the inwardly trenched spring element—first spring element 21 here—it is achieved that upper center of area 215 of the upper part continues to be situated above lower center of area 215' of the lower part. In particular, "the inwardly trenched spring element" here refers to the spring element which—as seen looking from a viewing direction in parallel to normal direction 101 toward substrate 10—has a flank 211 extending toward the respective other spring element. First and/or second width(s) 230, 240 of the compensation element is/are preferably adapted in the manufacturing method to trench angle 201' to a degree corresponding to trench angle 201'. A basic shape (i.e., a shape of a precursor structure from which compensation elements 23, 24 are formed in a recess area 25 in a fourth method step), a geometric shape (i.e., height in parallel to normal direction 101 and/or width in parallel to main extension plane 100 of substrate 10) and/or a distance between first and second spring elements 21, 22 is/are preferably adapted in such a way that a wobbling motion is avoided.

Figure 8:
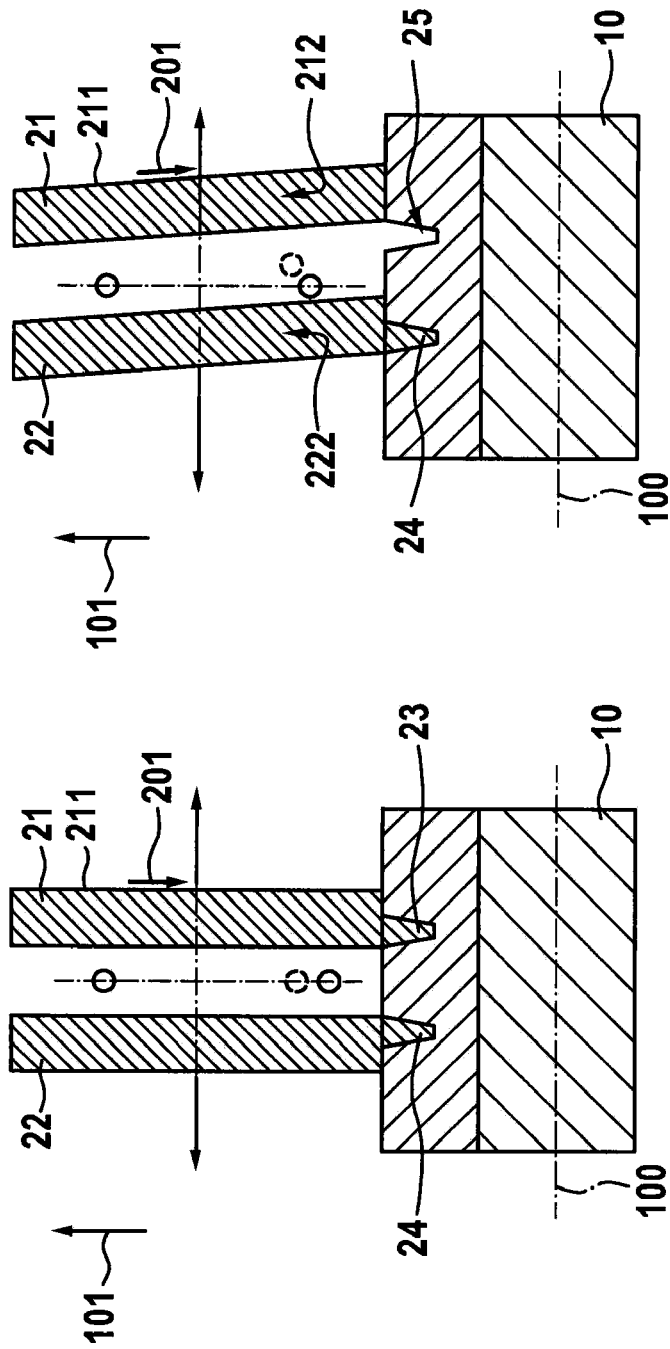

FIG. 8 shows a schematic cross-sectional view of a spring structure 20 of a micromechanical sensor 1 according to different specific embodiments of the present invention, in particular the specific embodiment shown here being essentially identical to the other specific embodiments of the present invention. The structuring of first layer 301 is preferably carried out in such a way that a trapezoidal recess 25 (having a positive further flank) is created in first layer 301. In this way, it is advantageously possible for remainders to be created in the area (indicated by reference numeral 25' on the right side of FIG. 8) when the trench process extends into this area.

FIG. 9 shows a schematic cross-sectional view of a micromechanical sensor 1 according to one specific embodiment of the present invention, in particular the specific embodiment shown here being essentially identical to the other specific embodiments of the present invention. This figure illustrates that movable mass element 30 is coupled to substrate 10 via a spring structure 20, first and second spring elements 21, 22 extending essentially in parallel to each other in sections and being coupled to each other in sections—in particular via coupling elements 26.

Figure 10A:
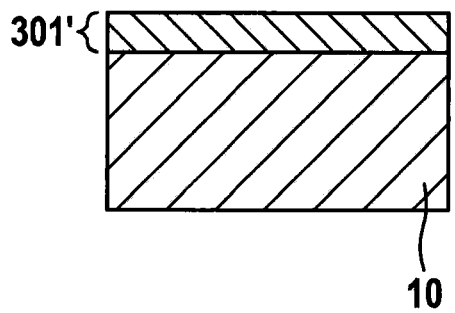
Figure 10B:
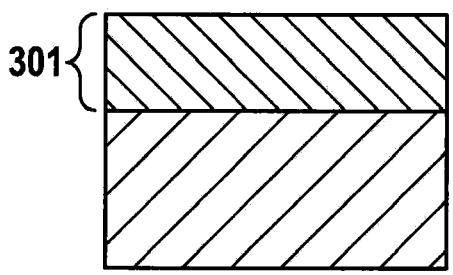
Figure 10C:
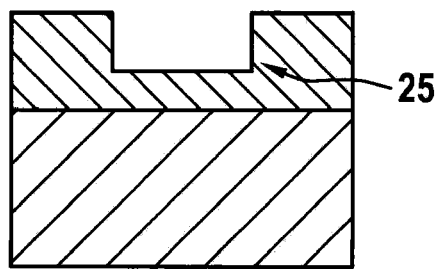
Figure 10F:
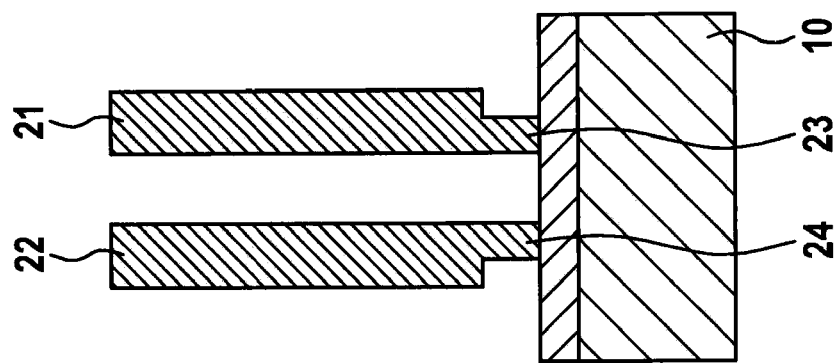
Figure 10E:
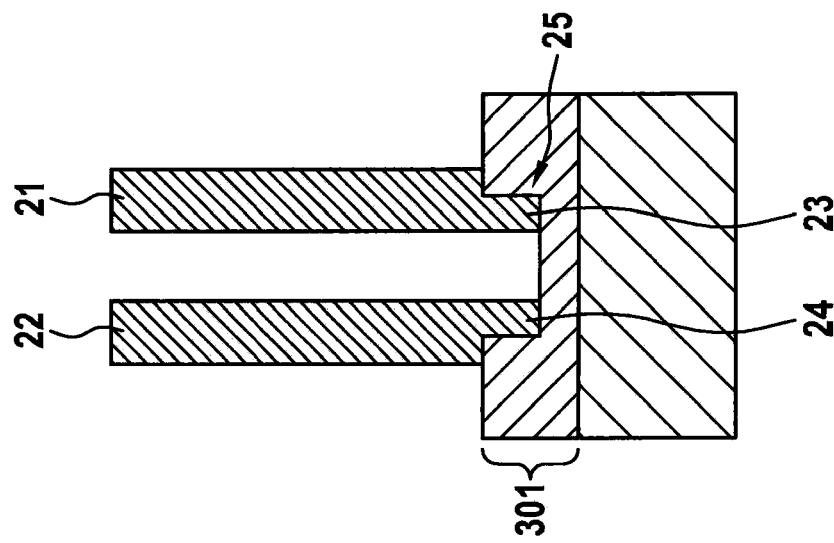
Figure 10D:
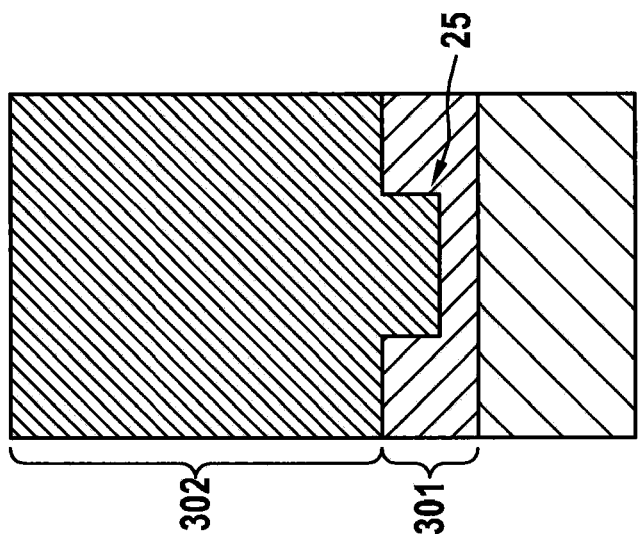

FIGS. 10a through 10f show a method for manufacturing a micromechanical sensor 1 according to one specific embodiment of the present invention, in particular the specific embodiment shown here being essentially identical to the other specific embodiments of the present invention. In a first manufacturing step, a first layer 301 is deposited on a substrate 10, substrate 10 or first layer 301 including a first sub-layer 301' (see FIG. 10a). Subsequently, a recess area 25 is created in first layer 301, as shown in FIG. 10c, in a second manufacturing step on the substrate having first layer 301 (see FIG. 10b). The structuring of first layer 301 is carried out with the aid of a time etching process, for example. In a third manufacturing step, a second layer 302 is thereafter deposited in particular in such a way that recess area 25 is filled with the material of second layer 302. In a fourth manufacturing step, second layer 302 is structured, spring structure 20 and mass element 30 being formed of second layer 302, spring structure 20 being configured in such a way that a first and a second spring element 21, 22 of spring structure 20 extend essentially in parallel to each other in sections and are coupled to each other in sections. In the fourth manufacturing step, during the structuring of second layer 302, moreover first compensation element 23 and second compensation element 24 for quadrature compensation are formed in recess area 25, so that first compensation element 23 is connected to first spring element 21, and second compensation element 24 is connected to second spring element 24 (see FIG. 10e). In a subsequent fifth manufacturing step, mass element 30 and spring structure 20 are exposed, first layer 301 being at least partially removed. For example, first layer 301 is removed in a sacrificial layer etching process, for example hydrogen fluoride (HF) gas phase etching, and spring structure 20 is exposed.

Figure 11A:
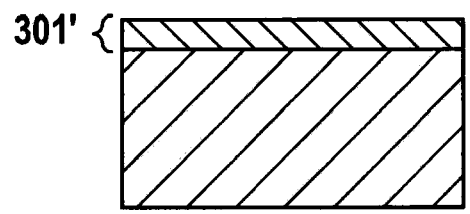
Figure 11B:
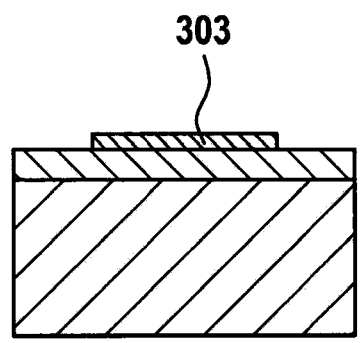
Figure 11C:
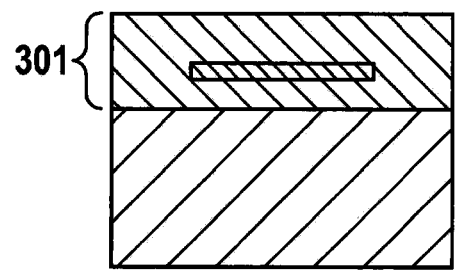
Figure 11D:
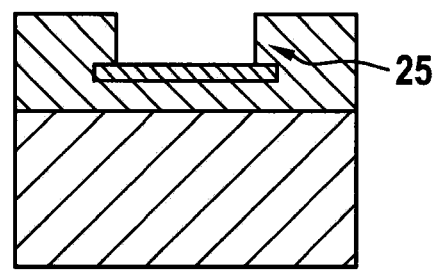

FIGS. 11a through 11g show a method for manufacturing a micromechanical sensor 1 according to one specific embodiment of the present invention, in particular the specific embodiment shown here being essentially identical to the other specific embodiments of the present invention, a third layer 303—for example a stop layer 303—being applied to first sub-layer 301' here prior to the first method step or during the first method step (see FIGS. 11a, 11b, and 11c). The stop layer is a buried polysilicon layer, for example. Third layer 303 is used in particular to create an L-shaped first and second compensation element 23, 24 (see FIGS. 11d, 11e, 11f, and 11g).

Figure 12:
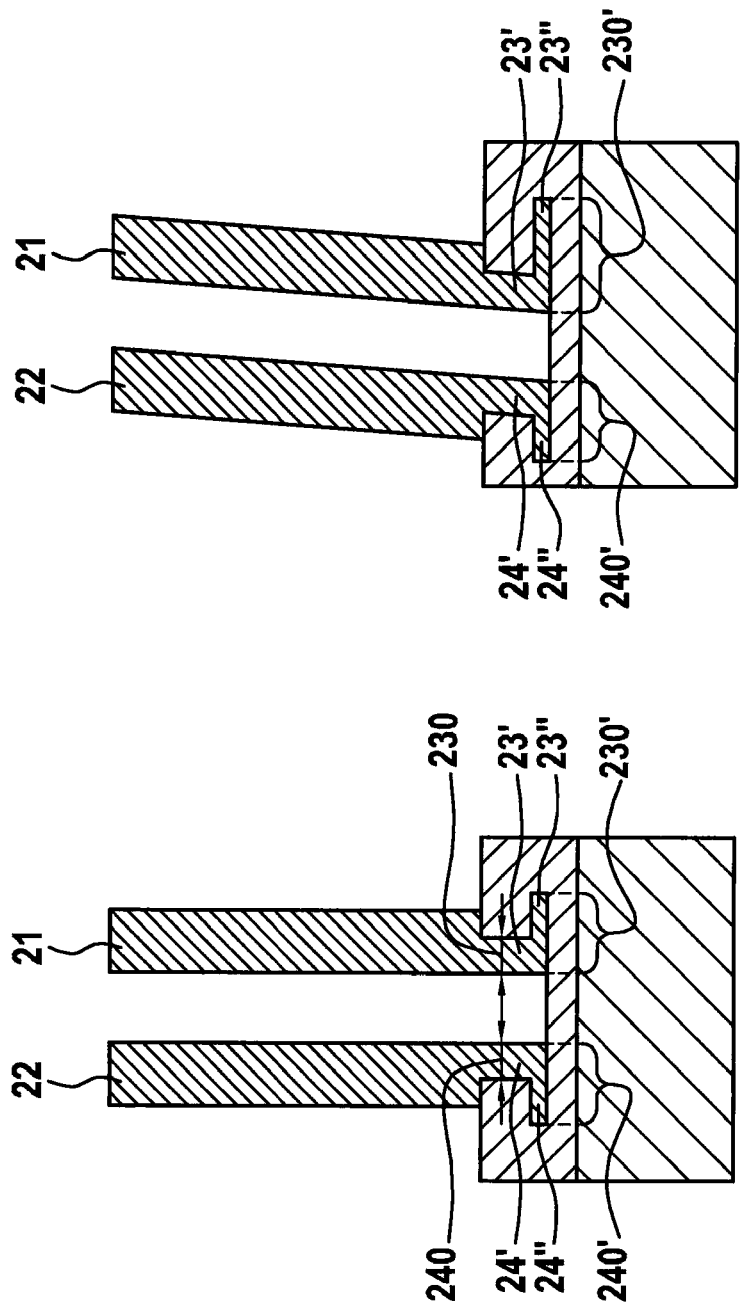
FIG. 12 shows a spring structure of a micromechanical sensor according to different specific embodiments of the present invention.

FIG. 12 shows a spring structure 20 of a micromechanical sensor 1 according to different specific embodiments of the present invention, the specific embodiment shown here being essentially identical to the other specific embodiments of the present invention. The first subarea is indicated here by reference numeral 23' and the second subarea by reference numeral 24'. First compensation element 23 extends in a further first subarea (see reference numeral 23") in parallel to transverse direction 102 along a further first width 230', and second compensation element 24 extends in a further second subarea (see reference numeral 24") in parallel to transverse direction 102 along a further second width 240'. Further first width 230' is greater than first spring structure width 210 here, and further second width 240' is greater than second spring structure width 220 here. In particular, the first and second subareas are also referred to as first and second connecting areas. The first and second connecting areas (see reference numerals 23', 24') in each case have a recess on sides of first and second spring elements 21, 22 which face away from each other. The further first and second subareas are also referred to as first and second additional areas here. As a result of a comparatively wide additional structure, it is advantageously possible due to a spring rigidity (which preferably scales with the third power of the width) to implement a first and second compensation element which has a comparatively low height (along normal direction 101), and is thus particularly easy to manufacture, a quadrature generated by oblique trench angles nonetheless being compensated for.

What is claimed is:
1. A micromechanical sensor, comprising:
a substrate having a main extension plane;
a mass element movable relative to the substrate; and
a spring structure via which the mass element is coupled to the substrate, wherein:
the spring structure includes a first spring element and a second spring element,
the first and second spring elements extend essentially in parallel to each other in sections,
the spring structure includes a first compensation element and a second compensation element for quadrature compensation,
the first compensation element is connected to the first spring element,
the second compensation element is connected to the second spring element,
the first spring element has a first spring structure width extending along a transverse direction,
the second spring element has a second spring structure width extending along the transverse direction,
the first compensation element in a first subarea extends in parallel to the transverse direction along a first width taken along the transverse direction,
the first spring structure width and the first width are different,
the second compensation element in a second subarea extends in parallel to the transverse direction along a second width taken along the transverse direction,
the second spring structure width and the second width are different,
the first spring element includes a first trench flank that extends along a first longitudinal direction,
the first width of the first compensating element is adapted to a first trench angle formed between a normal direction perpendicular to the substrate and the longitudinal direction along which the first trench flank extends,
the second spring element includes a second trench flank that extends along a second longitudinal direction, and
the second width of the first compensating element is adapted to a second trench angle formed between the normal direction and the second longitudinal direction along which the second trench flank extends.
2. The micromechanical sensor as recited in claim 1, wherein:
at least one of:
the first width of the first compensation element and the second width of the second compensation element are essentially equally large when the longitudinal direction and the normal direction are oriented in parallel to each other, the normal direction being oriented essentially perpendicularly to the main extension plane of the substrate, and
the first width of the first compensation element and the second width of the second compensation element are different when the longitudinal direction and the normal direction are not oriented in parallel to each other.

3. The micromechanical sensor as recited in claim 1, wherein:
the first compensation element is connected to the first spring element in such a way that the first compensation element is at least partially situated between the substrate and the first spring element, and
the second compensation element is connected to the second spring element in such a way that the second compensation element is at least partially situated between the substrate and the second spring element.

4. The micromechanical sensor as recited in claim 1, wherein:
a first cross-sectional area of the first spring element and a second cross-sectional area of the second spring element have the same cross-sectional shape.

5. The micromechanical sensor as recited in claim 4, wherein the first spring structure width and the second spring structure width are equally large.

6. The micromechanical sensor as recited in claim 1, wherein:
the first compensation element in a further first subarea extends in parallel to the transverse direction along a further first width,
the second compensation element in a further second subarea extends in parallel to the transverse direction along a further second width, and
at least one of the further first width is greater than the first spring structure width and the further second width is greater than the second spring structure width.

7. The micromechanical sensor as recited in claim 6, wherein the first subarea is primarily situated in an area of the first spring element facing the second spring element, the second subarea being primarily situated in an area of the second spring element facing the first spring element.

8. The micromechanical sensor of claim 1, wherein the first spring structure width is larger than the first width.

9. The micromechanical sensor of claim 1, wherein the second spring structure width is larger than the second width.

10. The micromechanical sensor of claim 1, wherein the first compensation element and the second compensation element are L-shaped.

11. The micromechanical sensor of claim 1, wherein the first compensation element has a third width taken along the transverse direction that is larger than the first width.

12. The micromechanical sensor of claim 1, wherein the second compensation element has a fourth width taken along the transverse direction that is larger than the second width.

* * * * *